United States Patent
Seregin et al.

(10) Patent No.: US 12,418,681 B2
(45) Date of Patent: Sep. 16, 2025

(54) CONTEXT MODELING FOR SIGN PREDICTION FOR VIDEO CODING

(71) Applicant: QUALCOMM Incorporated, San Diego, CA (US)

(72) Inventors: Vadim Seregin, San Diego, CA (US); Louis Joseph Kerofsky, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 17/656,319

(22) Filed: Mar. 24, 2022

(65) Prior Publication Data

US 2022/0312043 A1    Sep. 29, 2022

Related U.S. Application Data

(60) Provisional application No. 63/167,507, filed on Mar. 29, 2021.

(51) Int. Cl.
| | |
|---|---|
| H04N 19/70 | (2014.01) |
| H04N 19/129 | (2014.01) |
| H04N 19/176 | (2014.01) |
| H04N 19/18 | (2014.01) |

(52) U.S. Cl.
CPC ........... *H04N 19/70* (2014.11); *H04N 19/129* (2014.11); *H04N 19/176* (2014.11); *H04N 19/18* (2014.11)

(58) Field of Classification Search
CPC ..... H04N 19/176; H04N 19/70; H04N 19/129
See application file for complete search history.

(56) References Cited

U.S. PATENT DOCUMENTS

| | | | |
|---|---|---|---|
| 2012/0230417 A1* | 9/2012 | Sole Rojals | H04N 7/00 375/240.18 |
| 2018/0176563 A1 | 6/2018 | Zhao et al. | |
| 2019/0208225 A1* | 7/2019 | Chen | H04N 19/176 |
| 2020/0236350 A1* | 7/2020 | Xu | H04N 19/18 |
| 2020/0404311 A1 | 12/2020 | Filippov et al. | |

(Continued)

FOREIGN PATENT DOCUMENTS

| | | |
|---|---|---|
| CN | 111819852 A | 10/2020 |
| TW | 201826786 A | 7/2018 |

OTHER PUBLICATIONS

Abdoli M., et al., "Non-CE3: Decoder-side Intra Mode Derivation with Prediction Fusion Using Planar", JVET-O0449, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-9.

(Continued)

*Primary Examiner* — Zhubing Ren
(74) *Attorney, Agent, or Firm* — Shumaker & Sieffert, P. A.

(57) ABSTRACT

A video coder may code a sign prediction syntax element that indicates whether a sign prediction hypothesis is correct for a transform coefficient. The video coder may code the sign prediction syntax element using a context-based coding process. The video coder may determine a context for coding the sign prediction syntax element based on a position of the transform coefficient in the block of video data. The context may be further based on a coding mode used to code the block.

29 Claims, 10 Drawing Sheets

(56) References Cited

U.S. PATENT DOCUMENTS

2021/0014509 A1* 1/2021 Filippov ............... H04N 19/48
2022/0109864 A1* 4/2022 Krishnan ............... H04N 19/18

OTHER PUBLICATIONS

Chang Y-J., et al., "EE2: Tests of Compression Efficiency Methods Beyond VVC", JVET-V0120-v1, Joint Video Experts Team (JVET) of ITU-T SG 16 WP 3 and ISO/IEC JTC 1/SC 29, 22nd Meeting, by teleconference, Apr. 20-28, 2021, pp. 1-30.

Chang Y-J., et al., "Compression Efficiency Methods Beyond VVC", 21. JVET Meeting, Joint Video Experts Team (JVET) of ITU-T SG 16 WP 3 and ISO/IEC JTC 1/SC 29, JVET-U0100, 133. MPEG Meeting, 21st Meeting, by teleconference, Jan. 6-15, 2021, (The Joint Video Exploration Team of ISO/IEC JTC1/SC29/WG11 and ITU-T SG.16), No. JVET-U0100, Dec. 31, 2020 (Dec. 31, 2020), XP030293237, Jan. 1, 2021-Jan. 15, 2021, Online, (Motion Picture Expert Group or ISO/IEC JTC1/SC29/WG11), No. m55890, XP030290689, pp. 1-13.

Chen J., et al., "Algorithm Description for Versatile Video Coding and Test Model 10 (VTM 10)", JVET-S2002-v2, Joint Video Experts Team (JVET) of ITU-T SG 16 WP 3 and ISO/IEC JTC 1/SC 29/WG 11, 131. MPEG Meeting, 19th Meeting: by teleconference, Jun. 22-Jul. 1, 2020, Jun. 29, 2020-Jul. 3, 2020, Online, (Motion Picture Expert Group or ISO/IEC JTC1/SC29/WG11), No. m54825, Aug. 12, 2020 (Aug. 12, 2020), XP030293004, pp. 1-99.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-102.

Chen Y., et al., "Description of SDR, HDR and 360° Video Coding Technology Proposal by Qualcomm and Technicolor—Low and High Complexity Versions", JVET-J0021, Joint Video Exploration Team (JVET) of ITU-T SG 16 WP 3 and ISO/IEC JTC 1/SC 29/WG 11, 10th Meeting: San Diego, US, Apr. 10-20, 2018, pp. 1-42.

Filippov A., et al., "Residual Sign Prediction in Transform Domain for Next-Generation Video Coding", Industrial Technology Advances, vol. 8, Oct. 11, 2019, pp. 1-13.

Han Y., et al., "CE4.4.6: Improvement on Merge/Skip Mode", JVET-L0399_r1, Joint Video Exploration Team (JVET) of ITU-T SG 16 WP 3 and ISO/IEC JTC 1/SC 29/WG 11, 12th Meeting: Macao, CN, Oct. 3-12, 2018, JVET-L0399, pp. 1-10.

Henry F., et al., "Residual Coefficient Sign Prediction", 4th JVET Meeting, Oct. 15, 2016-Oct. 21, 2016, Chengdu, (The Joint Video Exploration Team of ISO/IEC JTC1/SC29/WG11 and ITU-T SG.16 WG 3), URL: http://phenix.int-evry.fr/jvet/, No. JVET-D0031, Oct. 20, 2016 (Oct. 20, 2016), JVET-D0031-v2, JVET-D0031-v4, XP030150258, pp. 1-6.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Li G., et al., "CE2-2.2: Affine Merge with Prediction Offset", JVET-N0378, Joint Video Experts Team (JVET) of ITU-T SG 16 WP 3 and ISO/IEC JTC 1/SC 29/WG 11, 14th Meeting: Geneva, CH, Mar. 17-29, 2019, pp. 1-5.

Lin Z-Y., et al., "CE10.2.1: OBMC", JVET-L0101-v1, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-7.

Ray B., et al., "Unified PDPC for Angular Intra Modes", JVET-Q391-v1, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-7.

Ray B (Qualcomm)., et al., "Unified PDPC for Angular Intra Modes", JVET-Q0391-v3, Joint Video Experts Team (JVET) of ITU-T SG 16 WP 3 and ISO/IEC JTC 1/SC 29/WG 11, 17th Meeting, Brussels, BE, Jan. 7-17, 2020, Jan. 8, 2020 (Jan. 8, 2020), m51986, XP030223398, pp. 1-7, Retrieved from the Internet: URL:http://phenix.int-evry.fr/ivet/doc_end_user/documents/17_Brussels/wg11/JVET-Q0391-v3.zip, JVET-Q0391-v3/JVET-Q0391-v3.docx [retrieved on Jan. 8, 2020].

Schwarz H., et al., "Additional Support of Dependent Quantization with 8 states", JVET-Q0243-v1, Joint Video Experts Team (JVET) of ITU-T SG 16 WP 3 and ISO/IEC JTC 1/SC 29/WG 11, 16th Meeting: Geneva, CH, Oct. 1-11, 2019, pp. 1-12.

Seregin V., et al., "Exploration Experiment on Enhanced Compression Beyond VVC Capability", JVET-U2024-v1, Joint Video Experts Team (JVET) of ITU-T SG 16 WP 3 and ISO/IEC JTC 1/SC 29, 21st Meeting, by teleconference, Jan. 6-15, 2021, pp. 1-14.

Seregin V., et al., "CE4-3.1a and CE4-3.1b: Unidirectional Local Illumination Compensation with Affine Prediction", Joint Video Experts Team (JVET) of ITU-T SG 16 WP 3 and ISO/IEC JTC 1/SC 29/WG 11, JVET-O0066-v1, 15th Meeting, Gothenburg, SE, Jul. 3-12, 2019, pp. 1-5.

Seregin V., et al., "Block Shape Dependent Intra Mode Coding", 4 JVET Meeting, Chengdu, (The Joint Video Exploration Team of ISO/IEC JTC1/SC29/WG11 and ITU-T SG.16), URL: http://phenix.int-evry.fr/jvet/, No. JVET-D0114, Oct. 15-21, 2016, XP030150361, Oct. 6, 2016 (Oct. 6, 2016), 3 pages.

Winken M., et al., "CE10: Multi-Hypothesis Inter Prediction (Test 10.1.2)", JVET-M0425-v1, Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-12.

Zhang K., et al., "Enhanced Cross-Component Linear Model Intra-prediction", 4. JVET Meeting, Oct. 15, 2016-Oct. 21, 2016, Chengdu, (The Joint Video Exploration Team of ISO/IEC JTC1/SC29/WG11 and ITU-T SG.16); URL: http://phenix.int-evry.fr/jvet/, No. JVET-D0110, Oct. 6, 2016 (Oct. 6, 2016), XP030150354, pp. 1-5.

Zhao X., et al., "Six Tap Intra Interpolation Filter", JVET-D0119, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-3.

Zhao L., et al., "Non-CE: Weighted Intra and Inter Prediction Mode", Joint Video Experts Team (JVET) of ITU-T SG 16 WP 3 and ISO/IEC JTC 1/SC 29/WG 11, JVET-O0537, 15th Meeting: Gothenburg, SE, Jul. 3-12, 2019, Doc: JVET-O0537, pp. 1-6.

International Search Report and Written Opinion—PCT/US2022/071346—ISA/EPO—Jul. 11, 2022.

Sullivan (Microsoft) G.J., et al., "Meeting Report of the 22nd JVET Meeting (Teleconference, Apr. 20-28, 2021)", 22, JVET Meeting, Apr. 20, 2021-Apr. 28, 2021, Teleconference, (The Joint Video Exploration Team of ISO/IEC JTC1/ SC29/WG11 and ITU-T SG.16), No. JVET-V1000, m57018, May 26, 2021, XP030294424, pp. 1-201, Retrieved from the Internet: URL: https://jvet-experts.org/doc_end_user/documents/22_Teleconference/wg11/JVET-V1000-v1.zipJVET-V1000.docx.

Seregin V., et al., "Exploration Experiment on Enhanced Compression Beyond VVC Capability", 21. JVET Meeting, Jan. 6, 2021-Jan. 15, 2021, Teleconference, (The Joint Video Exploration Team of ISO/IEC JTC1/SC29/WG11 and ITU-T SG.16 WP 3), No. JVET-U2024-V2, m56284, Feb. 17, 2021, XP030293402, pp. 1-19.

Taiwan Search Report—TW111111326—TIPO—May 16, 2025.

* cited by examiner $$\begin{bmatrix} 5 \\ -2 \end{bmatrix} = \begin{bmatrix} 0 \\ 1 \end{bmatrix} \cdot 5 + \begin{bmatrix} 1 \\ 0 \end{bmatrix} \cdot -2$$

FIG. 2

CONTEXT MODELING FOR SIGN PREDICTION FOR VIDEO CODING

This application claims the benefit of U.S. Provisional Patent Application No. 63/167,507, filed Mar. 29, 2021, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for sign prediction in video coding. In particular, this disclosure describes techniques for determining a context for coding a sign prediction syntax element using context-based coding. A sign prediction syntax element is a syntax element that indicates whether a sign prediction hypothesis for a transform coefficient matches the actual sign value of the transform coefficient. A sign prediction hypothesis is a prediction as to whether the sign of a particular transform coefficient has a positive or negative value. A video coder may determine a context (e.g., a probability model) for coding the sign prediction using context-based coding.

In particular, this disclosure describes techniques wherein a video coder is configured to determine the context based on one or more of a position of the transform coefficient in a block and/or a coding mode (e.g., inter or intra coding) used for coding the block. Because the characteristics (e.g., magnitudes and signs) of transform coefficients may differ based on the position within the block and/or the coding modes used to generate the transform coefficients, using the position of the transform coefficient and/or the coding mode to determine a context for coding a sign prediction may improve coding efficiency.

In one example, this disclosure describes a method of decoding video data, the method comprising determining a context for decoding a sign prediction syntax element for a transform coefficient based on a position of the transform coefficient in a block of video data, wherein the sign prediction syntax element indicates whether a sign prediction hypothesis is correct for the transform coefficient, and decoding the sign prediction syntax element using the context.

In another example, this disclosure describes an apparatus configured to decode video data, the apparatus comprising a memory configured to store a block of video data, and one or more processors implemented in circuitry and in communication with the memory, the one or more processors configured to determine a context for decoding a sign prediction syntax element for a transform coefficient based on a position of the transform coefficient in the block of video data, wherein the sign prediction syntax element indicates whether a sign prediction hypothesis is correct for the transform coefficient, and decode the sign prediction syntax element using the context.

In another example, this disclosure describes an apparatus configured to decode video data, the apparatus comprising means for determining a context for decoding a sign prediction syntax element for a transform coefficient based on a position of the transform coefficient in a block of video data, wherein the sign prediction syntax element indicates whether a sign prediction hypothesis is correct for the transform coefficient, and means for decoding the sign prediction syntax element using the context.

In another example, this disclosure describes a non-transitory computer-readable storage medium storing instructions that, when executed, cause one or more processors configured to decode video data to determine a context for decoding a sign prediction syntax element for a transform coefficient based on a position of the transform coefficient in the block of video data, wherein the sign prediction syntax element indicates whether a sign prediction hypothesis is correct for the transform coefficient, and decode the sign prediction syntax element using the context.

In another example, this disclosure describes an apparatus configured to encode video data, the apparatus comprising a memory configured to store a block of video data, and one or more processors implemented in circuitry and in communication with the memory, the one or more processors configured to determine a context for encoding a sign prediction syntax element for a transform coefficient based on a position of the transform coefficient in the block of video data, wherein the sign prediction syntax element indicates whether a sign prediction hypothesis is correct for the transform coefficient, and encode the sign prediction syntax element using the context.

The details of one or more examples are set forth in the accompanying drawings and the description below. Other features, objects, and advantages will be apparent from the description, drawings, and claims.

BRIEF DESCRIPTION OF DRAWINGS

FIG. 2 is a conceptual diagram illustrating an example transform block decomposition in accordance with the techniques of this disclosure.

DETAILED DESCRIPTION

A video encoder may code a block of video data using a coding mode, such as inter prediction or intra prediction. In some examples, the video encoder may form a residual block of video data that represents the differences between the block being coded and a predictive block. The residual block may then be transformed into the frequency domain to create a block of transform coefficients. The transform coefficients may be quantized to integer values. Each transform coefficient is represented by a magnitude (e.g., an absolute value) and a sign (e.g., positive or negative).

In some examples, the video encoder may be configured to perform sign prediction for a certain number of transform coefficients. For example, if two signs are predicted, then there can be 4 possible combinations, or sign prediction hypotheses: (+, +), (+, −), (−, +), (−, −). For all four combinations, a cost function is calculated and the combination (e.g., the sign prediction hypothesis) with the minimum cost is selected as a sign predictor combination. A video decoder may perform a reciprocal process.

For the transform coefficients on which sign prediction is performed, instead of bypass signaling, a video encoder may encode and signal a context coded bin (e.g., a sign prediction syntax element) to indicate whether the actual transform coefficient sign is equal to the hypothesis or not. In previous techniques, the contexts used to code the sign prediction syntax elements were dependent on the transform coefficient magnitude. This disclosure describes different techniques of determining the contexts for coding sign prediction syntax elements. In particular, a video coder may determine the context based on one or more of a position of the transform coefficient in a block and/or a coding mode used for coding the block. Because the characteristics (e.g., magnitudes and signs) of transform coefficients may differ based on position within the block and the coding modes used to generate the transform coefficients, using the position of the transform coefficient and/or the coding mode to determine a context for coding a sign prediction may improve coding efficiency.

Figure 1:
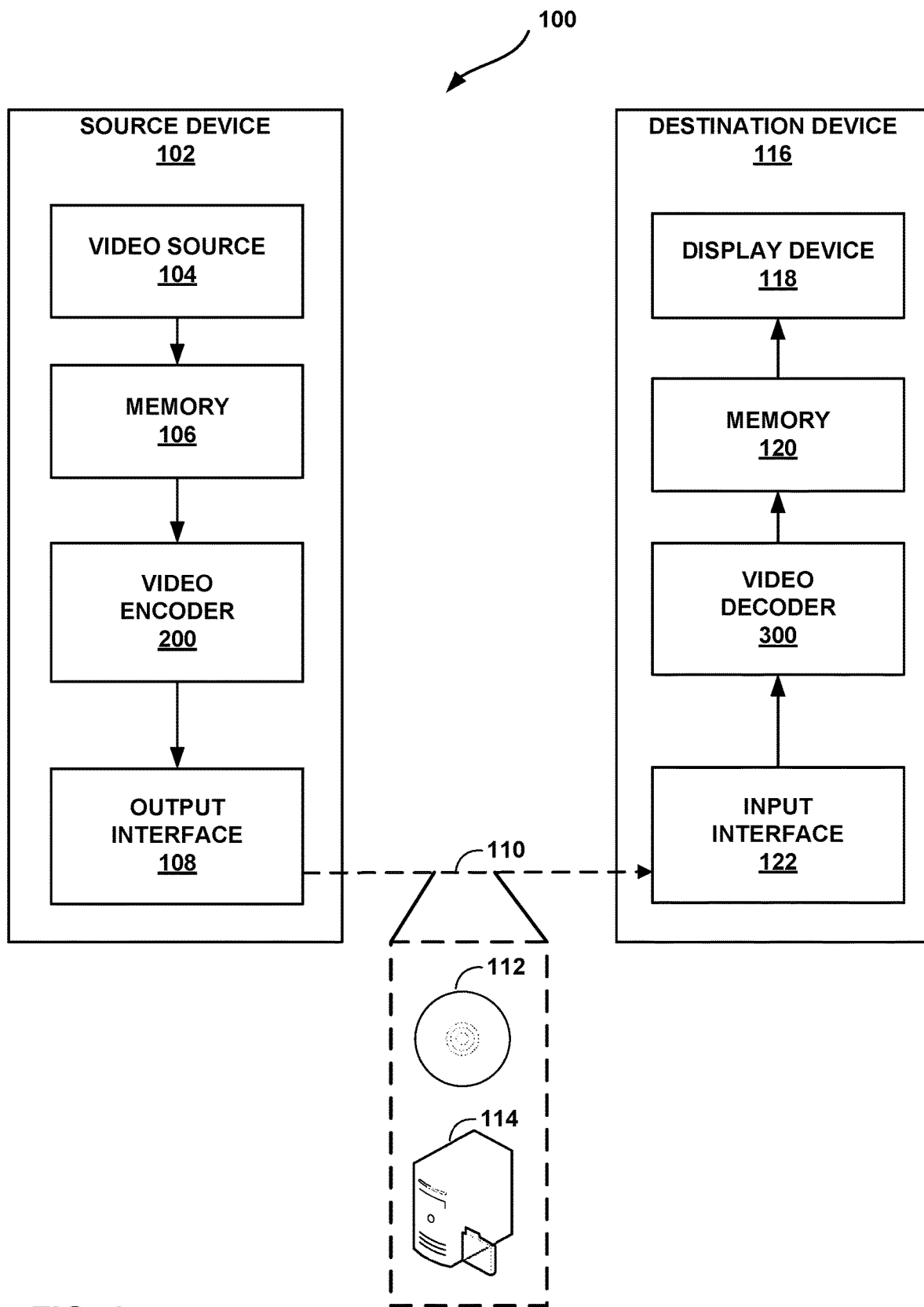
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for context modeling for sign prediction in video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for context modeling for sign prediction in video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use sign prediction and/or code one or more syntax elements relating to sign prediction using a probability model (e.g., as indicated by a context).

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks.

Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction coding mode, video encoder 200 and video decoder 300 do not use video data from other frames of video data. For most intra prediction coding modes, video encoder 200 encodes blocks of a current frame based on the difference between sample values in the current block and predicted values generated from reference samples in the same frame. Video encoder 200 determines predicted values generated from the reference samples based on the intra prediction coding mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As briefly described above, video encoder 200 may be configured to perform sign prediction for a certain number of transform coefficients. For example, if two signs are predicted, then there can be 4 possible combinations, or sign prediction hypotheses: (+, +), (+, −), (−, +), (−, −). For all four combinations, a cost function is calculated and the combination (e.g., the sign prediction hypothesis) with the minimum cost is selected as a sign predictor combination. Video decoder 300 may perform a reciprocal process.

For the transform coefficients on which sign prediction is performed, instead of bypass signaling, video encoder 200 may encode and signal a context coded bin (e.g., a sign prediction syntax element) to indicate whether the actual transform coefficient sign is equal to the hypothesis or not. In previous techniques, the contexts used to code the sign prediction syntax elements were dependent on the transform coefficient magnitude. This disclosure describes different techniques of determining the contexts for coding sign prediction syntax elements. In particular, video encoder 200 and video decoder 300 may be configured to determine a context for coding a sign prediction syntax element for a transform coefficient based on a position of the transform coefficient in the block of video data, wherein the sign prediction syntax element indicates whether a sign prediction hypothesis is correct for the transform coefficient, and code the sign prediction syntax element using the context.

The authors of Yao-Jen Chang, et. al. "Compression efficiency methods beyond VVC," Joint Video Experts Team (JVET) of ITU-T SG 16 WP 3 and ISO/IEC JTC 1/SC 29, $21^{st}$ Meeting, by teleconference, 6-15 Jan. 2021, (hereinafter, "JVET-U0100"), describe a coding tool called transform coefficient sign prediction. One basic idea of an example transform coefficient sign prediction method is, for applicable transform coefficients, to calculate reconstructed residuals for both negative and positive sign combinations and select the hypothesis that minimizes a cost function.

For example, if video encoder 200 and video decoder 300 are configured to predict two sign values for two transform coefficients, then there can be four possible combinations: two positive signs (+, +), a positive sign followed by a negative sign (+, -), a negative sign followed by a positive sign (-, +), and two negative signs (-, -). For all four combinations, video encoder 200 and video decoder 300 may be configured to calculate a cost function and select the combination of signs with the minimum cost as a sign predictor combination (e.g., the sign prediction hypothesis). The same process is applied if more signs are predicted with more combinations to be tried. The number of combinations to analyze is a tradeoff between implementation complexity and compression efficiency. That is, more sign combinations may result in better coding efficiency, but at the cost of implementation complexity.

For the transform coefficients to which sign prediction can be applied, instead of bypass coding (e.g., fixed probability coding) a syntax element indicating the sign itself, video encoder 200 may be configured to encode and signal a context coded bin (e.g., syntax element) to indicate whether or not a sign of a transform coefficient is equal to the sign prediction hypothesis. Likewise, video decoder 300 may be configured to receive and decode the context coded bin (e.g., syntax element) to determine whether the sign of the currently decoded transform coefficient is equal to the sign prediction hypothesis or not. In one example, the contexts (e.g., probability models) used by video encoder 200 and video decoder 300 are dependent on the transform coefficient magnitude. That is, video encoder 200 and video decoder 300 determine the magnitude of transform coefficients, and then use that magnitude to determine what contexts to use. In one example, video encoder 200 and video decoder 300 may be configured to use two contexts per luma and chroma components (e.g., 2 for luma and 2 for chroma), separately. This disclosure describes other example techniques for the context modeling (e.g., the determination of contexts) for sign prediction. The techniques of this disclosure may result in context selections that provide for increased coding efficiency.

In some examples of sign prediction coding, video encoder 200 and video decoder 300 do not perform inverse transformation to reconstruct the residual block. Instead, video encoder 200 and video decoder 300 may derive the reconstructed residual block based on prestored elemental residuals multiplied by a coefficient magnitude accumulated for all coefficients for which a sign value is predicted.

In more detail, any transform coefficient block can be represented as a sum of blocks where only one transform coefficient is nonzero. Moreover, that one nonzero transform coefficient value can be set to a value of 1. To obtain the final reconstructed residual block, video encoder 200 and video decoder 300 may multiply the reconstructed residual corresponding to coefficient magnitude equal to 1 by the signed coefficient magnitude. FIG. 2 is a conceptual diagram illustrating an example transform block decomposition.

As shown in FIG. 2, transform coefficient block 400 includes two non-zero coefficients. The coefficient in the upper left has a value of 5 and the coefficient two coefficients to the right has a value of -2. Transform coefficient block 400 can be decomposed as a sum of transform coefficients blocks 402 and 404. Transform coefficient block 402 has a single non-zero transform coefficient in the upper left corner with a value of 1 and is multiplied by 5 (e.g., the magnitude and sign of the original transform coefficient in transform coefficient block 400). Transform coefficient block 404 has a single non-zero transform coefficient, two positions to the right of the upper left corner, with a value of 1 and is multiplied by -2 (e.g., the magnitude and sign of the original transform coefficient in transform coefficient block 400).

As can be seen from the example of FIG. 2, an inverse transform may only be calculated once for every single nonzero coefficient with magnitude equal to 1. Video decoder 300 may be configured to derive the final reconstruction as a scaled sum of the reconstructed elemental residuals. The reconstructed elemental residuals (or templates) are pre-calculated and stored in a look-up table with a predetermined (e.g., 8-bit) accuracy for each element of the table. Since the discontinuity is measured considering only the first row and first column of a transform block, as will be explained later, the look-up table size can be reduced to the length of the width plus the height of the block, per transform basis function. The transform basis functions, which are used to calculate the templates, correspond to a primary transform (e.g., enhanced multiple transform (EMT)) basis. However, since the accuracy is reduced to 8 bits, the resulting templates could be the same or similar. In such cases, the templates are merged to reduce the storage memory.

In some examples, the accuracy of sign prediction depends on the coefficient magnitude. A smaller magnitude generally makes a discontinuity measure difference less noticeable. So, for the given number of predicted signs, the non-zero coefficients in the top-left frequency area of a transform coefficient block are selected according to a coefficient magnitude threshold. The coefficient magnitude threshold classifies the coefficients into two groups, with a sign being predicted with high or low probability (e.g., a high probability context or a low probability context). The coefficients are scanned in the raster scan order and the coefficients with a magnitude above the threshold are classified to be in the high prediction probability group. Otherwise, the coefficient is classified to be in the low probability prediction group. If the number of coefficients in the high predicted probability group is smaller than the total number of coefficient signs to be predicted, then the coefficients from the low predicted probability group are added.

Figure 3:
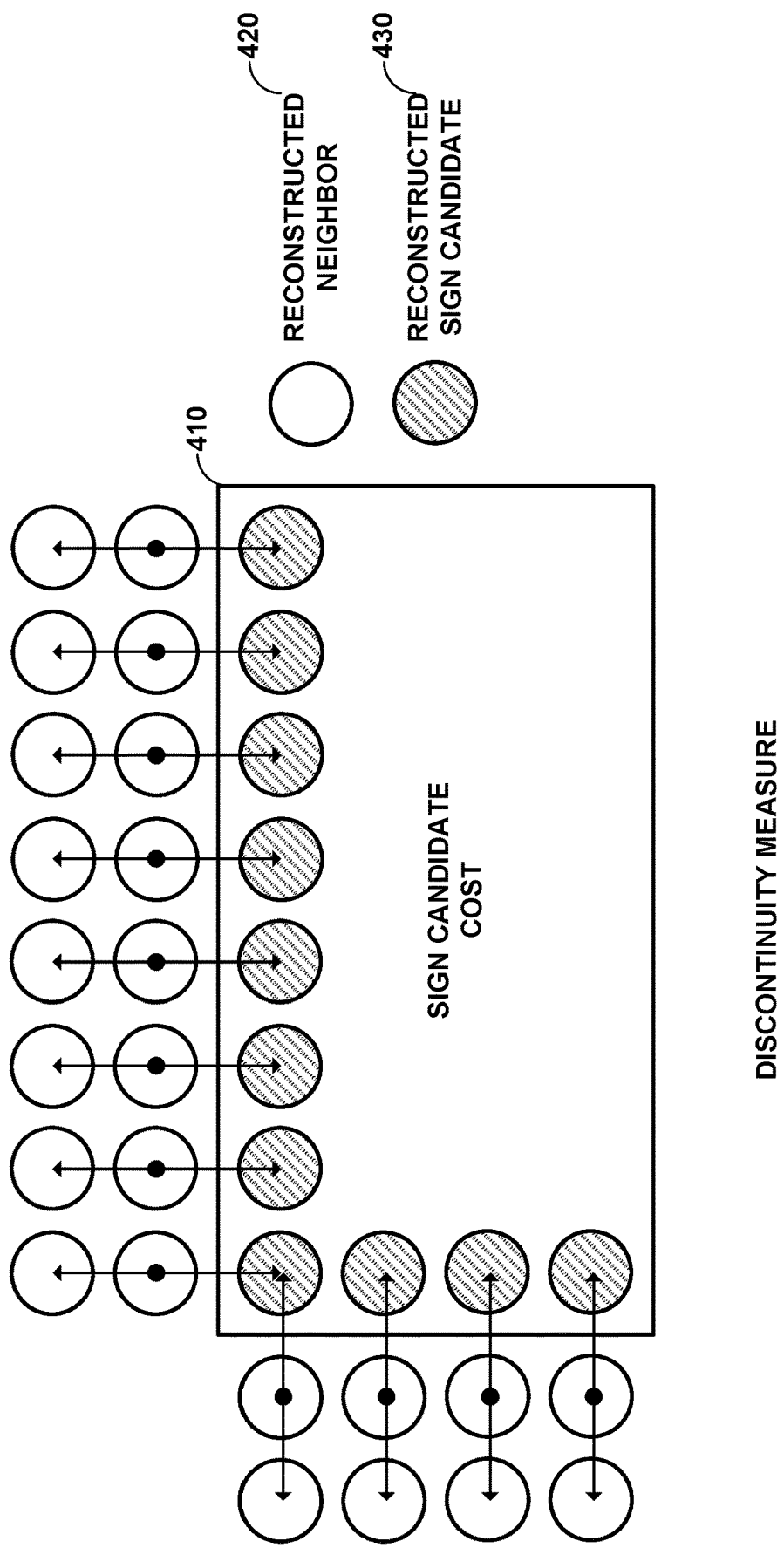
FIG. 3 is a conceptual diagram illustrating an example discontinuity measure in sign prediction in accordance with the techniques of this disclosure.

To derive the best sign prediction hypothesis among all possible combinations, a cost function may be defined and used. The cost function is defined as a discontinuity measure across a block boundary. Video encoder 200 and video decoder 300 may calculate the discontinuity measure for all hypotheses, and the hypothesis with the smallest cost is selected as a predictor for transform coefficient signs. FIG. 3 is a conceptual diagram illustrating an example discontinuity measure in sign prediction. FIG. 3 shows a block 410, with reconstructed neighbors 420 across the block boundary from reconstructed sign candidates 430. The discontinuity measure cost function is described below.

In one example, the cost function is defined as a sum of absolute second derivatives in the residual domain for the above row and left column as follows:

$$\text{cost} = \sum_{x=o}^{w} |(-R_{x,-1} + 2R_{x,0} - P_{x,1}) - r_{x,1}| + \sum_{y=o}^{h} |(-R_{-1,y} + 2R_{0,y} - P_{1,y}) - r_{1,y}|$$

where R is the reconstructed neighbors, P is the prediction of the current block, and r is the residual hypothesis. The term $(-R_{-1}+2R_0-P_1)$ can be calculated only once per block and only a residual hypothesis is subtracted.

In previous techniques for sign prediction, a syntax element that indicates whether the sign prediction is correct (e.g., the sign prediction hypothesis matches the actual sign) is context coded using contexts that depend on magnitudes of transform coefficients. Such a syntax element may be referred to as a sign prediction syntax element. Using the magnitudes of transform coefficients for determining sign prediction contexts requires the magnitudes be determined before sign prediction contexts can be selected and sign prediction syntax elements can be coded. Furthermore, in previous techniques for sign prediction the context selection does not depend on coefficient position within a block and does not depend on whether a block is intra or inter coded. Typically, intra predicted blocks tend to have more non-zero coefficients with higher magnitude. Using the same contexts for inter and intra coded blocks may create sub-optimal compression efficiency.

The techniques of this disclosure may address the abovementioned problems. In particular, the techniques of this disclosure may include determining a context for coding a sign prediction syntax element based on one or more of a position of the transform coefficient in a block and/or a coding mode used for coding the block. Because the characteristics (e.g., magnitudes and signs) of transform coefficients may differ based on position within the block and the coding modes used to generate the transform coefficients, using the position of the transform coefficient and/or the coding mode to determine a context for coding a sign prediction may improve coding efficiency. The techniques of this disclosure may be used to determine contexts for any sign prediction syntax elements, regardless of the techniques used to determine the value of the sign prediction syntax element itself.

The techniques described below may be used in any combination. For example, in addition to, or instead of, determining contexts based on coefficient magnitudes, any combination of the techniques for determining contexts described below may be used. In some examples, the usage of coefficient magnitude may be optional.

Transform Coefficient Position Dependent Contexts

In one example, to code a sign prediction syntax element, video encoder 200 and video decoder 300 may be configured to determine a context based on the transform coefficient position within a block or a position of a transform block itself if there are multiple transform blocks within one coding or prediction unit. Coding a sign prediction syntax element includes encoding and/or decoding a context coded bin that indicates whether or not a sign of a transform coefficient is equal to a sign prediction hypothesis. That is, video encoder 200 and video decoder 300 may be configured to code a syntax element that indicates whether or not a sign of a transform coefficient is equal to a sign prediction hypothesis using the determined context. Determining the context based on the transform coefficient within a block generally means that the position (e.g., location) of the transform coefficient in the block is an input to a function that determines the context to use.

In a general example of the disclosure, video encoder 200 may be configured to determine a context for encoding a sign prediction syntax element for a transform coefficient based on a position of the transform coefficient in the block of video data, wherein the sign prediction syntax element indicates whether a sign prediction hypothesis is correct for the transform coefficient, and encode the sign prediction syntax element using the context. In a reciprocal fashion, video decoder 300 may be configured to determine a context for decoding a sign prediction syntax element for a transform coefficient based on a position of the transform coefficient in the block of video data, wherein the sign prediction syntax element indicates whether a sign prediction hypothesis is correct for the transform coefficient, and decode the sign prediction syntax element using the context. Examples of positions of transform coefficients, and how those positions affect the context determination, are described in more detail below.

In one example, video encoder 200 and video decoder 300 may be configured to assign a dedicated context (e.g., context 0) for coding the sign prediction of a DC coefficient (e.g., the very first coefficient in the upper left corner of a block) and may assign another context (e.g., context 1) for coding the sign predictions of non-DC coefficients. That is, in general, video encoder 200 and video decoder 300 may determine the context for coding the sign prediction syntax element for the transform coefficient based on whether the transform coefficient is a DC coefficient. More specifically, in another example, video encoder 200 and video decoder 300 may be configured to determine a first context for decoding the sign prediction syntax element based on the transform coefficient being a DC coefficient, and determine a second context for decoding the sign prediction syntax element based on the transform coefficient not being the DC coefficient.

Figure 4:
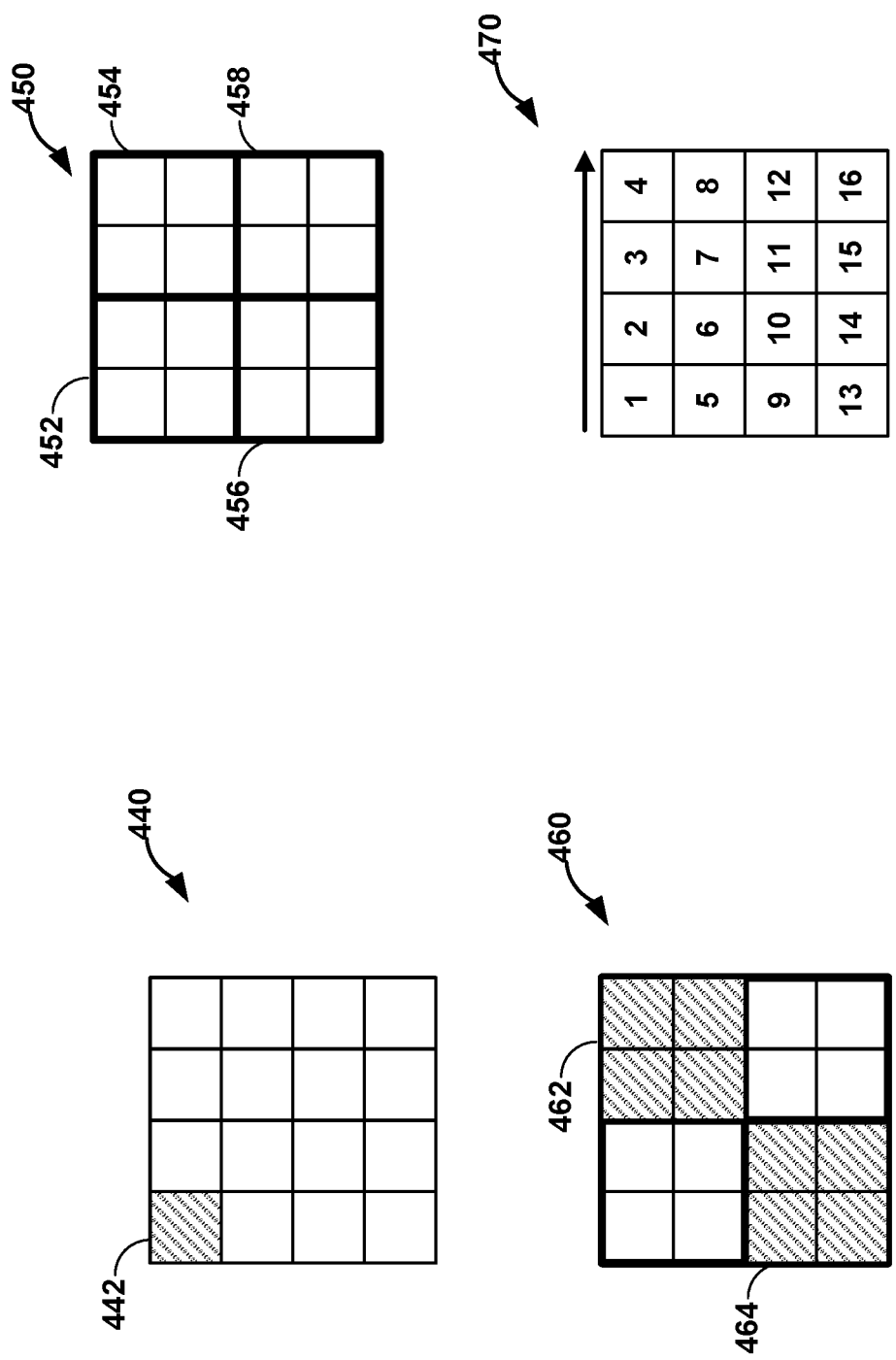
FIG. 4 is a conceptual diagram showing example positions of transform coefficients in accordance with the techniques of this disclosure.

FIG. 4 is a conceptual diagram showing example positions of transform coefficients. FIG. 4 shows examples of 4×4 blocks of transform coefficients. The individual small blocks represent the positions of transform coefficients for which a sign prediction syntax element might be coded. For the above example, FIG. 4 shows a block 440 having a DC coefficient 442. In general, the DC coefficient is the upper left transform coefficient in a block or sub-block. In the example of block 440, video encoder 200 and video decoder 300 may determine to use a first context for coding a sign prediction syntax element for DC coefficient 442 and may determine to use a second, different context for coding any sign prediction syntax elements for other transform coefficients of block 440.

In another example, video encoder 200 and video decoder 300 may divide a block into multiple parts or regions, where the parts or regions of the block are associated with a certain transform coefficient frequency. Video encoder 200 and video decoder 300 may determine a separate context for coding the sign prediction syntax elements in each part of the block. As one example, video encoder 200 and video decoder 300 may divide a block into four quadrants, and video encoder 200 and video decoder 300 may determine a separate context for coding the sign prediction syntax elements in each quadrant. However, a block may be divided into more or fewer regions. Also, the regions may be uniform in size, or may have different sizes.

In FIG. 4, transform block 450 is divided into four regions (e.g., quadrants): a first region 452, a second region 454, a third region 456, and a fourth region 458. Video encoder 200 and video decoder 300 may determine a separate context for coding the sign prediction syntax element in each of first region 452, second region 454, third region 456, and fourth region 458.

Video encoder 200 and video decoder 300 may also be configured to use a position symmetry in context determination for sign prediction syntax elements. For example, video encoder 200 and video decoder 300 may use the same context for coding sign prediction syntax elements for transform coefficients with positions of (x, y) and (y, x). For example, as shown in FIG. 4, if block 460 is divided into 4 quadrants, video encoder 200 and video decoder 300 may use the same contexts for coding the sign predictions in the second quadrant 462 and the third quadrants 464 (non-diagonal), as the second and third quadrants are symmetrical along the diagonal.

In another example, video encoder 200 and video decoder 300 may determine sign prediction syntax element contexts based on the sign prediction order. The sign prediction order may be defined by a scanning order within the block. The scanning order may be one of a raster scan order, a vertical scanning order, a horizontal scanning order, a zigzag scanning order, or any other order in which transform coefficients are coded. For example, the sign prediction syntax element for the first transform coefficient in the sign prediction order uses one context, the second sign prediction syntax element in the sign prediction order uses the second context, and so on. After a certain number of sign prediction syntax elements, video encoder 200 and video decoder 300 may use the same context for the remaining sign prediction syntax prediction syntax elements in the sign prediction order.

For example, video encoder 200 and video decoder 300 may use a separate context for the first sign prediction syntax elements or the first two sign prediction syntax elements in the sign prediction order. In some examples, the DC coefficient is the first coefficient scanned in the sign prediction order. Starting from the second or third sign prediction syntax element, video encoder 200 and video decoder 300 may use the same context for the remaining sign prediction syntax elements. Referring to FIG. 4, block 470 is scanned with a horizontal sign prediction order. The numbers shown for each of the transform coefficients show the order in which the sign prediction syntax elements are coded. In one example, the sign prediction syntax elements for transform coefficients 1 and 2 will share the same context, while any sign prediction syntax elements for transform coefficients 3-16 will share the same context. The idea behind this technique is that higher frequency coefficients (e.g., transform coefficients toward the lower right portion of the block) may have less distinct differences in the cost function, and the sign prediction detection may be less accurate as compared to the first coefficients in the block along the sign prediction order.

Coding Mode Dependent Contexts

In another example of the disclosure, video encoder 200 and video decoder 300 may determine contexts for sign prediction syntax elements based on the coding mode used to code the block having the transform coefficients. Different prediction modes may have different residual and transform coefficient characteristics. As mentioned earlier, intra and inter predicted blocks may have different residual energy (e.g., the absolute magnitudes of residual values may generally be higher for intra coded blocks).

It may be beneficial to use separate contexts for the sign prediction syntax elements of transform coefficients generated using different prediction modes. In some examples, video encoder 200 and video decoder 300 may determine contexts for coding sign prediction based on prediction mode in combination with other methods, for example, in combination with one or more of the position dependent context assignment techniques described above. For example, a first subset of contexts may be used for inter predicted blocks and a second subset of contexts may be used for intra predicted blocks. The particular context determined from each of the first and second subsets may then be based on the position of the transform coefficient in the block for which a sign prediction syntax elements is to be coded.

In one example, video encoder 200 and video decoder 300 may be configured to use separate contexts and/or separate sets of contexts for coding the sign prediction syntax elements for transform coefficients from blocks coded with intra and inter modes.

In another example, video encoder 200 and video decoder 300 may be configured to determine contexts for coding a sign prediction syntax element based on which type of primary transform kernel and/or secondary transform kernel is used when coding a block. In one example, video encoder 200 and video decoder 300 may be configured to determine the context for coding a sign prediction syntax element based on primary transform and/or secondary transform indices. In another example, video encoder 200 and video decoder 300 may be configured to determine the context for coding a sign prediction syntax element based on whether the primary transform is DCT2 or not. In another example, video encoder 200 and video decoder 300 may be configured to determine the context for coding a sign prediction syntax element based on whether a secondary transform is applied or not.

In another example, video encoder 200 and video decoder 300 may be configured to determine the context for coding a sign prediction syntax element based on the intra prediction coding mode (e.g., the intra prediction direction). In general, video encoder 200 and video decoder 300 may be configured to determine the context for coding a sign prediction syntax element as a function of a coding tool which can be applied to code a block. For example, video encoder 200 and video decoder 300 may be configured to determine a separate context for coding the sign prediction syntax element of transform coefficients for each coding tool that can be applied to the block.

Efficient Calculation

Predicting the sign (e.g., generating the sign prediction hypothesis) involves calculating a cost function for different sign prediction hypotheses and determining the sign prediction hypothesis with the minimal cost. The input to the cost function R is reconstructed neighbors, a prediction of the current block P, a set of known coefficients C, and a set of coefficients A whose absolute value is known, but the sign is to be predicted. The residual (r) has two components: a component corresponding to the known coefficients and a component corresponding to coefficients whose sign is to be predicted, $r=r^k+r^u$. The value $r^k=IT(C)$ is computed from the known coefficients using the Inverse Transform IT and $r^u$ is based on the coefficients whose sign is unknown, but the magnitude is known (A below).

Video encoder 200 and video decoder 300 may be configured to perform an efficient calculation of the sign prediction hypothesis using a template (template$_i$) of reconstructed basis functions. Given a set of coefficient absolute values and a set of sign prediction hypotheses, the residual hypothesis ($r^{hypothesis}$) is defined via a template as:

$$r^{hypothesis} = \Sigma_i \text{template}_i \cdot A_i \cdot \text{sign}_i^{hypothesis}$$

A number F is used to combine the template values to form a modified cost function. The cost function is modified to include the value F, the known residual, and the term based on a sign prediction hypothesis and the template values as follows:

$$\text{cost}^{hypothesis} = \sum_{x=0}^{W} \left|(-R_{x,-1} + 2 \cdot R_{x,0} - P_{x,1} - r_{x,1}^k) \ll F - r_{x,1}^{hypothesis}\right| + \sum_{y=0}^{H} \left|(-R_{-1,y} + 2 \cdot R_{0,y} - P_{1,y} - r_{1,y}^k) \ll F - r_{1,y}^{hypothesis}\right|$$

Video encoder 200 and video decoder 300 are configured to use the hypothesis which minimizes this modified cost function as the prediction of a sign value.

Figure 5:
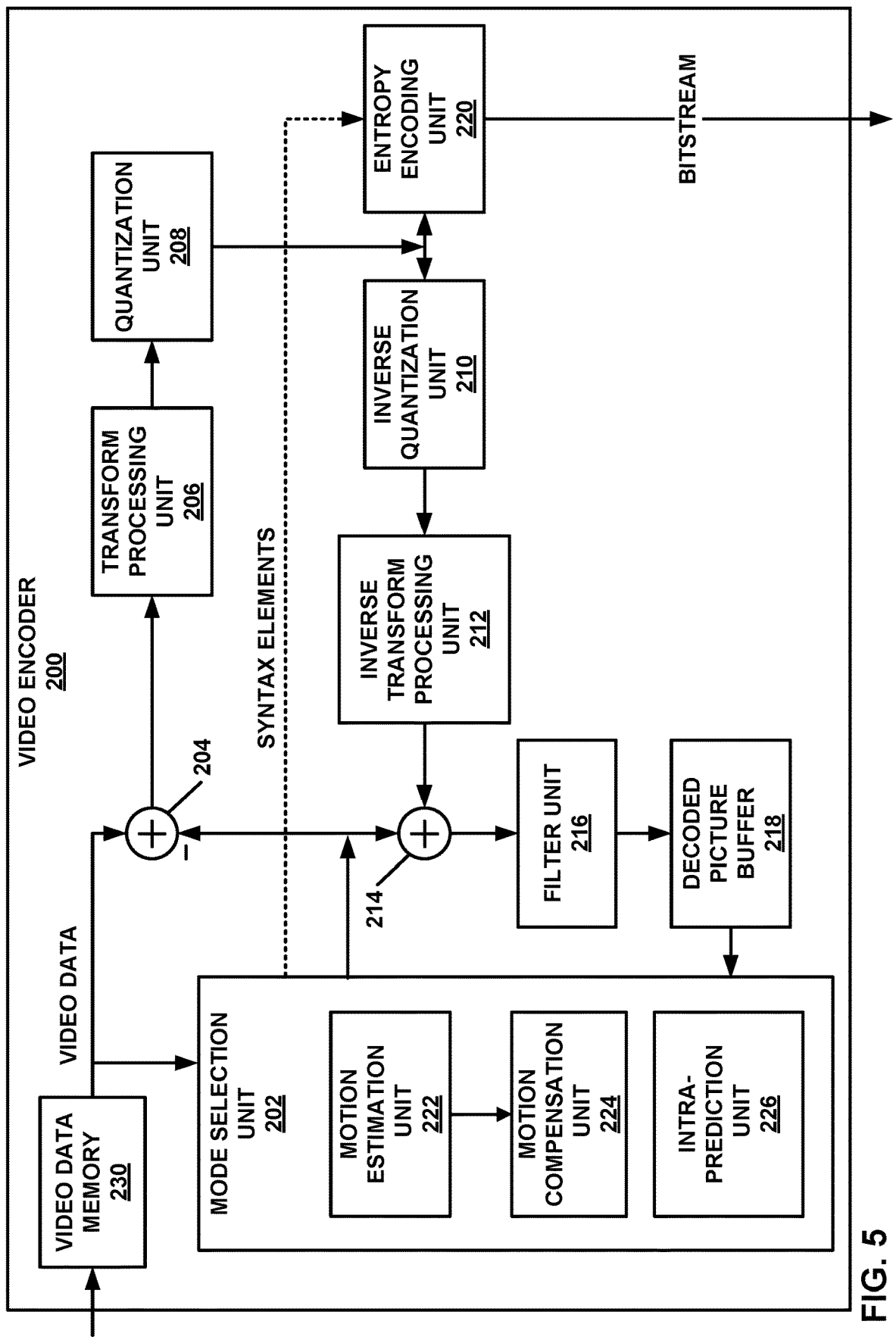
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

As discussed above, when performing sign prediction hypothesis, entropy encoding unit 220 may be configured to determine a context for coding a sign prediction syntax element for a transform coefficient based on a position of the transform coefficient, and code the sign prediction syntax element using the determined context.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine a context for coding a sign prediction syntax element for a transform coefficient based on a position of the transform coefficient, and code the sign prediction syntax element using the determined context.

Figure 6:
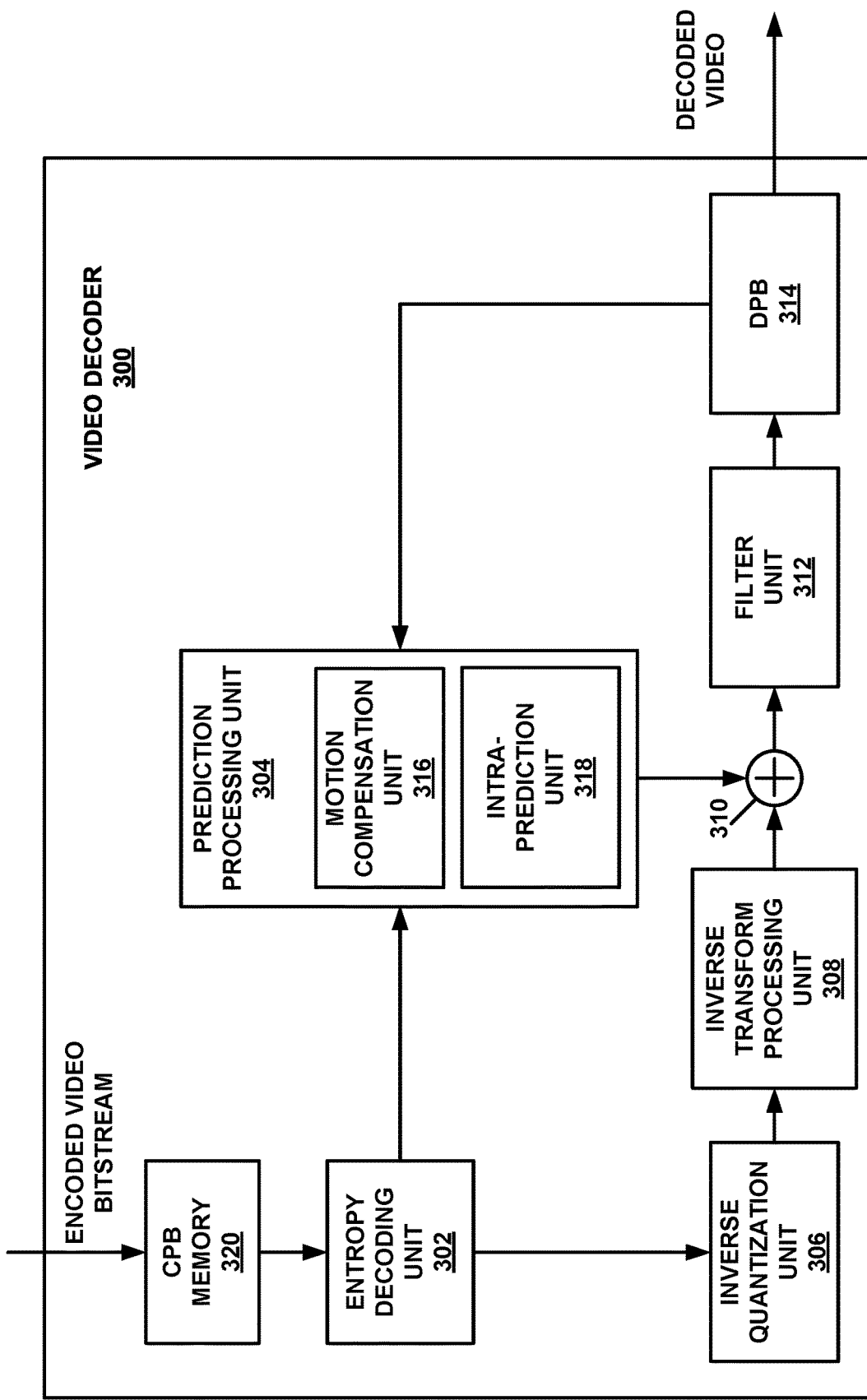
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). As was described above, when performing sign prediction hypothesis, entropy decoding unit 302 may be configured to determine a context for coding a sign prediction syntax element for a transform coefficient based on a position of the transform coefficient, and code the sign prediction syntax element using the determined context.

Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine a context for coding a sign prediction syntax element for a transform coefficient based on a position of the transform coefficient, and code the sign prediction syntax element using the determined context.

Figure 7:
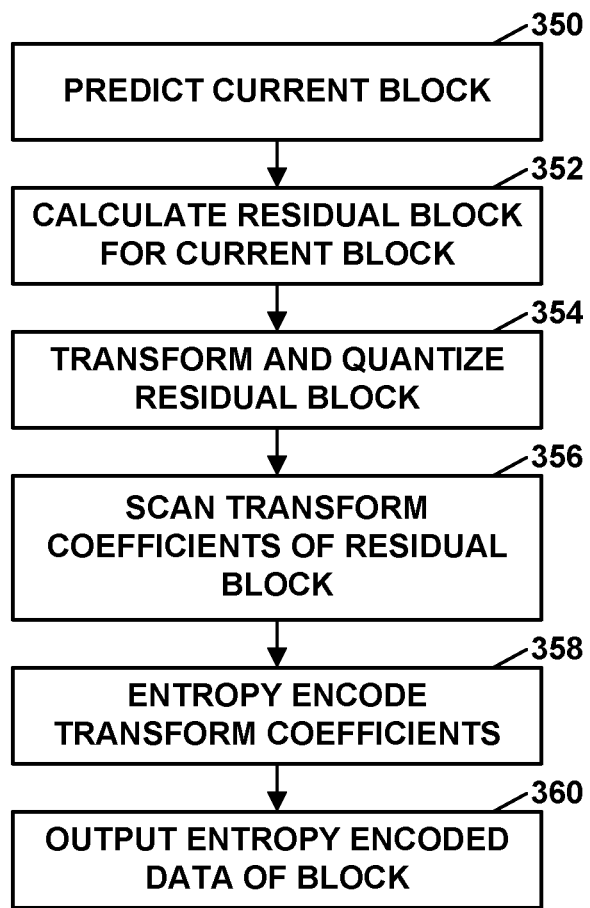
FIG. 7 is a flowchart illustrating an example method for encoding a current block in accordance with the techniques of this disclosure.

FIG. 7 is a flowchart illustrating an example method for encoding a current block in accordance with the techniques of this disclosure. The current block may comprise a current CU. Although described with respect to video encoder 200 (FIGS. 1 and 5), it should be understood that other devices may be configured to perform a method similar to that of FIG. 7.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 8:
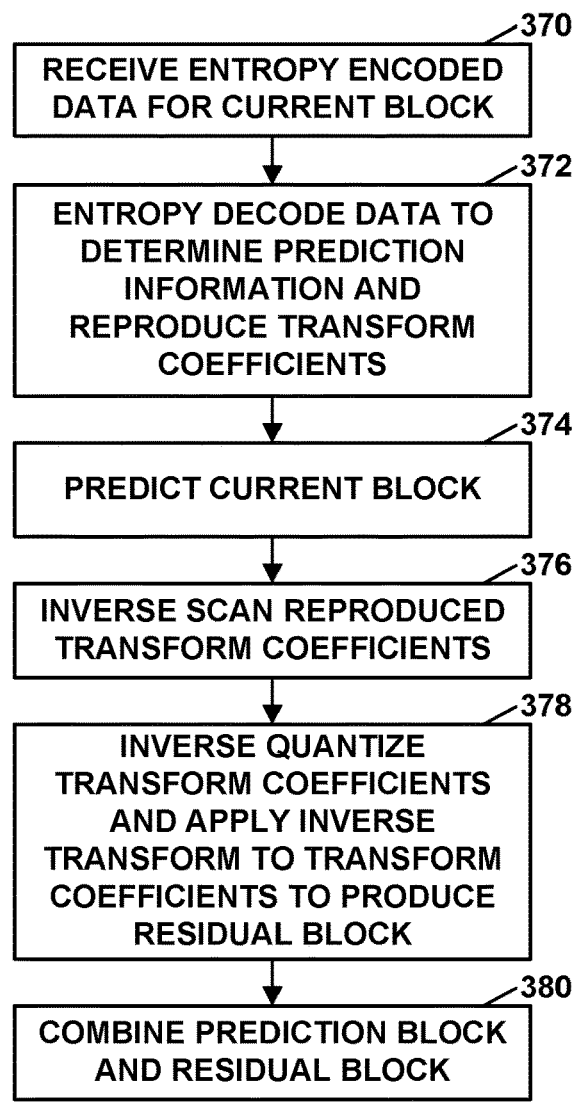
FIG. 8 is a flowchart illustrating an example method for decoding a current block in accordance with the techniques of this disclosure.

FIG. 8 is a flowchart illustrating an example method for decoding a current block of video data in accordance with the techniques of this disclosure. The current block may comprise a current CU. Although described with respect to video decoder 300 (FIGS. 1 and 6), it should be understood that other devices may be configured to perform a method similar to that of FIG. 8.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 9:
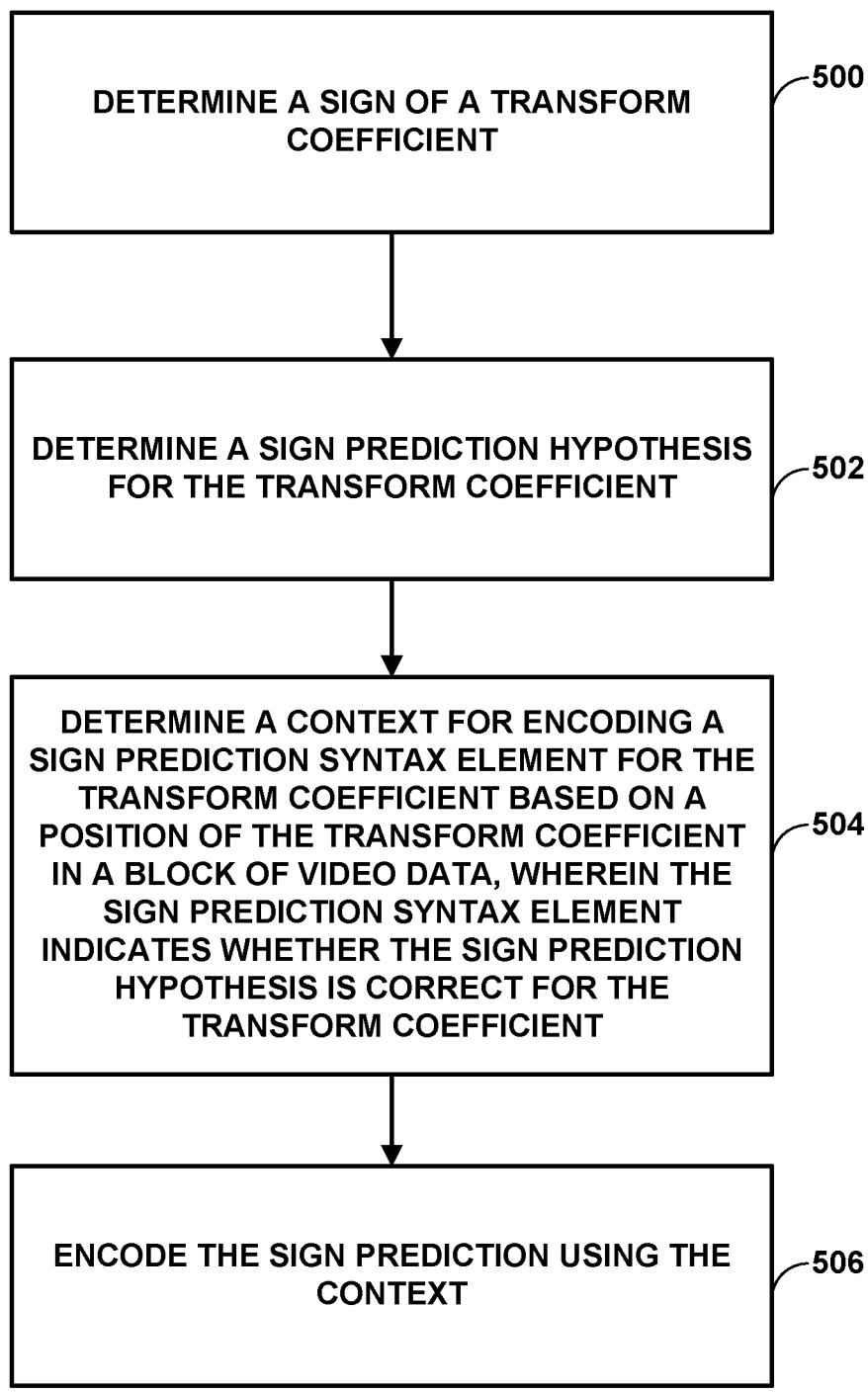
FIG. 9 is a flowchart illustrating another example method for encoding a current block in accordance with the techniques of this disclosure.

FIG. 9 is a flowchart illustrating another example method for encoding a current block in accordance with the techniques of this disclosure. The techniques of FIG. 9 may be performed by one or more structural units of video encoder 200, including entropy encoding unit 220.

In one example of the disclosure, video encoder 200 may be configured to determine a sign of transform coefficient (500). Video encoder 200 may be further configured to determine a sign prediction hypothesis for the transform coefficient (502). In one example, video encoder 200 may determine the sign prediction hypothesis by minimizing a cost function that includes combined template values.

Video encoder 200 may further determine a context for encoding a sign prediction syntax element for the transform coefficient based on a position of the transform coefficient in the block of video data, wherein the sign prediction syntax element indicates whether a sign prediction hypothesis is correct for the transform coefficient (504). Video encoder 200 may further encode the sign prediction syntax element using the context (506).

In one example, to determine the context for encoding the sign prediction syntax element for the transform coefficient based on the position of the transform coefficient in the block of video data, video encoder 200 is further configured to determine the context for encoding the sign prediction syntax element for the transform coefficient based on whether the transform coefficient is a DC coefficient.

In another example, to determine the context for encoding the sign prediction syntax element for the transform coefficient based on the position of the transform coefficient in the block of video data, video encoder 200 is further configured to determine a first context for encoding the sign prediction syntax element based on the transform coefficient being a DC coefficient, and determine a second context for encoding the sign prediction syntax element based on the transform coefficient not being the DC coefficient.

In another example, to determine the context for encoding the sign prediction syntax element for the transform coefficient based on the position of the transform coefficient in the block of video data, video encoder 200 is further configured to determine the context for encoding the sign prediction syntax element based on a sign prediction order in the block of video data, wherein the position of the transform coefficient in the block of video data is based on the sign prediction order.

In another example, video encoder 200 is further configured to determine the context for encoding the sign prediction syntax element for the transform coefficient further based on a coding mode used to encode the block. That is, video encoder 200 is configured to determine the context for the sign prediction syntax element based on both the position of the transform coefficient and the coding mode.

In another example, to determine the context for encoding the sign prediction syntax element for the transform coefficient further based on the coding mode, video encoder 200 is further configured to determine the context for encoding the sign prediction syntax element further based on whether the coding mode used to code the block of video data is an inter prediction coding mode or an intra prediction coding mode.

In another example, video encoder 200 is further configured to determine the context for encoding the sign prediction syntax element for the transform coefficient further based on an intra prediction direction.

Figure 10:
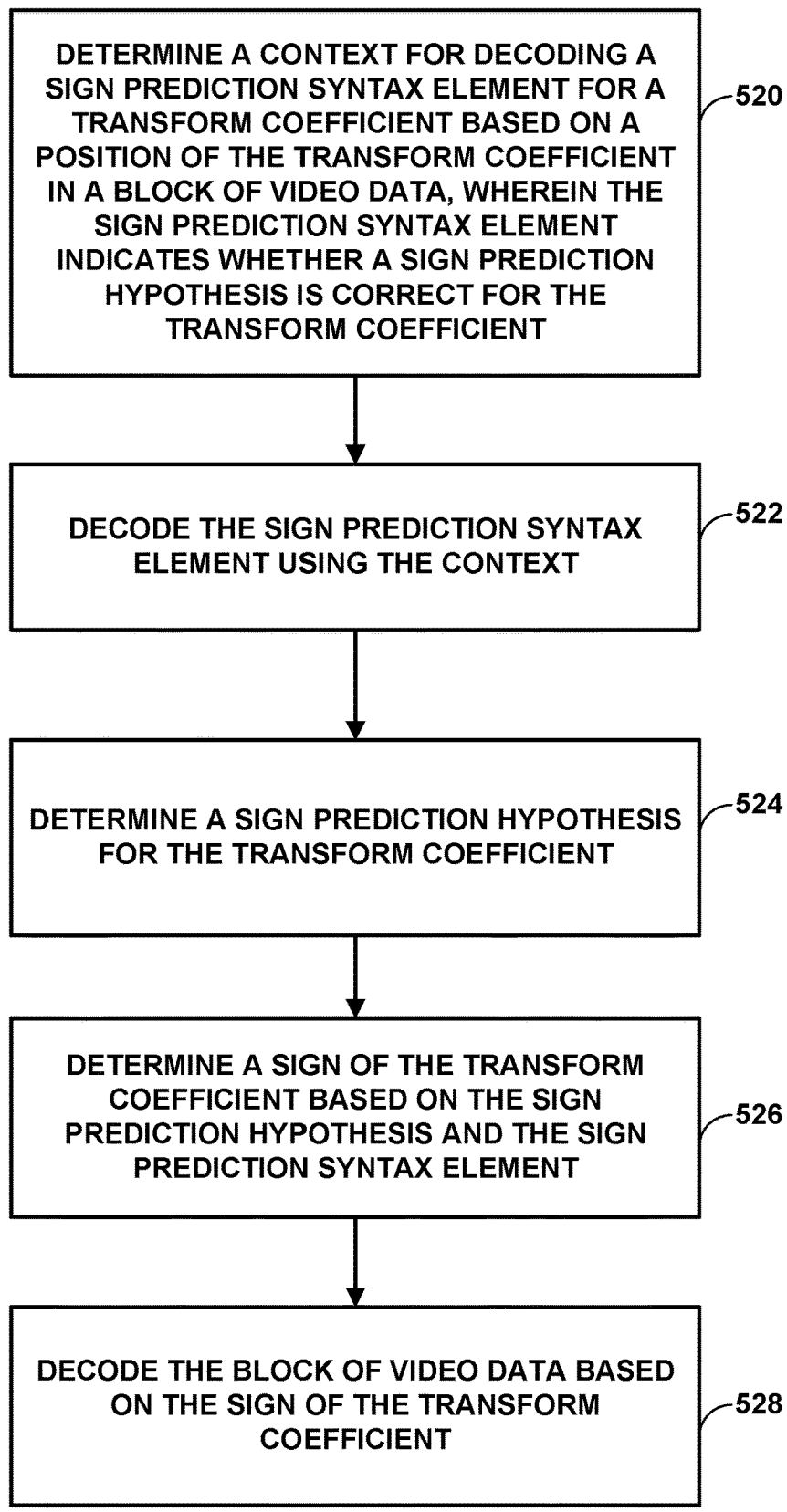
FIG. 10 is a flowchart illustrating another example method for decoding a current block in accordance with the techniques of this disclosure.

FIG. 10 is a flowchart illustrating another example method for decoding a current block in accordance with the techniques of this disclosure. The techniques of FIG. 10 may be performed by one or more structural units of video decoder 300, including entropy decoding unit 302.

In one example of the disclosure, video decoder 300 is configured to determine a context for decoding a sign prediction syntax element for a transform coefficient based on a position of the transform coefficient in a block of video data, wherein the sign prediction syntax element indicates whether a sign prediction hypothesis is correct for the transform coefficient (520). Video decoder 300 may then decode the sign prediction syntax element using the context (522).

Video decoder 300 may be further configured to determine a sign prediction hypothesis for the transform coefficient (524). For example, video decoder 300 may determine the sign prediction hypothesis by minimizing a cost function that includes combined template values. Video decoder 300 may then determine a sign of the transform coefficient based on the sign prediction hypothesis and the sign prediction syntax element (526), and decode the block of video data based on the sign of the transform coefficient (528).

In one example, to determine the context for decoding the sign prediction syntax element for the transform coefficient based on the position of the transform coefficient in the block of video data, video decoder 300 is further configured to determine the context for decoding the sign prediction syntax element for the transform coefficient based on whether the transform coefficient is a DC coefficient.

In another example, to determine the context for decoding the sign prediction syntax element for the transform coefficient based on the position of the transform coefficient in the block of video data, video decoder 300 is further configured to determine a first context for decoding the sign prediction syntax element based on the transform coefficient being a DC coefficient, and determine a second context for decoding the sign prediction syntax element based on the transform coefficient not being the DC coefficient.

In another example, to determine the context for decoding the sign prediction syntax element for the transform coefficient based on the position of the transform coefficient in the block of video data, video decoder 300 is further configured to determine the context for decoding the sign prediction syntax element based on a sign prediction order in the block of video data, wherein the position of the transform coefficient in the block of video data is based on the sign prediction order.

In another example, video decoder 300 is further configured to determine the context for decoding the sign prediction syntax element for the transform coefficient further based on a coding mode used to encode the block.

In another example, to determine the context for decoding the sign prediction syntax element for the transform coefficient further based on the coding mode, video decoder 300 is further configured to determine the context for decoding the sign prediction syntax element further based on whether the coding mode used to code the block of video data is an inter prediction coding mode or an intra prediction coding mode.

In another example, video decoder 300 is further configured to determine the context for decoding the sign prediction syntax element for the transform coefficient further based on an intra prediction direction.

Other illustrative aspects of the techniques and devices of the disclosure are described below.

Aspect 1—A method of decoding video data, the method comprising: determining a context for decoding a sign prediction syntax element for a transform coefficient based on a position of the transform coefficient in a block of video data, wherein the sign prediction syntax element indicates whether a sign prediction hypothesis is correct for the transform coefficient; and decoding the sign prediction syntax element using the context.

Aspect 2—The method of Aspect 1, wherein determining the context for decoding the sign prediction syntax element for the transform coefficient based on the position of the transform coefficient in the block of video data comprises: determining the context for decoding the sign prediction syntax element for the transform coefficient based on whether the transform coefficient is a DC coefficient.

Aspect 3—The method of Aspect 1, wherein determining the context for decoding the sign prediction syntax element for the transform coefficient based on the position of the transform coefficient in the block of video data comprises: determining a first context for decoding the sign prediction syntax element based on the transform coefficient being a DC coefficient; and determining a second context for decoding the sign prediction syntax element based on the transform coefficient not being the DC coefficient.

Aspect 4—The method of Aspect 1, wherein determining the context for decoding the sign prediction syntax element for the transform coefficient based on the position of the transform coefficient in the block of video data comprises: determining the context for decoding the sign prediction syntax element based on a sign prediction order in the block of video data, wherein the position of the transform coefficient in the block of video data is based on the sign prediction order.

Aspect 5—The method of Aspect 1, further comprising: determining the context for decoding the sign prediction syntax element for the transform coefficient further based on a coding mode used to code the block of video data.

Aspect 6—The method of Aspect 5, wherein determining the context for decoding the sign prediction syntax element for the transform coefficient further based on the coding mode comprises: determining the context for decoding the sign prediction syntax element further based on whether the coding mode used to code the block of video data is an inter prediction coding mode or an intra prediction coding mode.

Aspect 7—The method of Aspect 1, further comprising: determining the context for decoding the sign prediction syntax element for the transform coefficient further based on an intra prediction direction.

Aspect 8—The method of any of Aspects 1-7, further comprising: determining a sign prediction hypothesis for the transform coefficient; determining a sign of the transform coefficient based on the sign prediction hypothesis and the sign prediction syntax element; and decoding the block of video data based on the sign of the transform coefficient.

Aspect 9—The method of Aspect 8, wherein determining the sign prediction hypothesis for the transform coefficient comprises: minimizing a cost function that includes combined template values.

Aspect 10—The method of Aspect 8, further comprising: displaying a picture that includes the block of video data.

Aspect 11. An apparatus configured to decode video data, the apparatus comprising: a memory configured to store a block of video data; and one or more processors implemented in circuitry and in communication with the memory, the one or more processors configured to: determine a context for decoding a sign prediction syntax element for a transform coefficient based on a position of the transform coefficient in the block of video data, wherein the sign prediction syntax element indicates whether a sign prediction hypothesis is correct for the transform coefficient; and decode the sign prediction syntax element using the context.

Aspect 12—The apparatus of Aspect 11, wherein to determine the context for decoding the sign prediction syntax element for the transform coefficient based on the position of the transform coefficient in the block of video data, the one or more processors are further configured to: determine the context for decoding the sign prediction syntax element for the transform coefficient based on whether the transform coefficient is a DC coefficient.

Aspect 13—The apparatus of Aspect 11, wherein to determine the context for decoding the sign prediction syntax element for the transform coefficient based on the position of the transform coefficient in the block of video data, the one or more processors are further configured to: determine a first context for decoding the sign prediction syntax element based on the transform coefficient being a DC coefficient; and determine a second context for decoding the sign prediction syntax element based on the transform coefficient not being the DC coefficient.

Aspect 14—The apparatus of Aspect 11, wherein to determine the context for decoding the sign prediction syntax element for the transform coefficient based on the position of the transform coefficient in the block of video data, the one or more processors are further configured to: determine the context for decoding the sign prediction syntax element based on a sign prediction order in the block of video data, wherein the position of the transform coefficient in the block of video data is based on the sign prediction order.

Aspect 15—The apparatus of Aspect 11, wherein the one or more processors are further configured to: determine the context for decoding the sign prediction syntax element for the transform coefficient further based on a coding mode used to code the block of video data.

Aspect 16—The apparatus of Aspect 15, wherein to determine the context for decoding the sign prediction syntax element for the transform coefficient further based on the coding mode, the one or more processors are further configured to: determine the context for decoding the sign prediction syntax element further based on whether the coding mode used to code the block of video data is an inter prediction coding mode or an intra prediction coding mode.

Aspect 17—The apparatus of Aspect 11, wherein the one or more processors are further configured to: determine the context for decoding the sign prediction syntax element for the transform coefficient further based on an intra prediction direction.

Aspect 18—The apparatus of any of Aspects 11-17, wherein the one or more processors are further configured to: determine a sign prediction hypothesis for the transform coefficient; determine a sign of the transform coefficient based on the sign prediction hypothesis and the sign prediction syntax element; and decode the block of video data based on the sign of the transform coefficient.

Aspect 19—The apparatus of Aspect 18, wherein to determine the sign prediction hypothesis for the transform coefficient, the one or more processors are further configured to: minimize a cost function that includes combined template values.

Aspect 20—The apparatus of Aspect 18, further comprising: a display configured to display a picture that includes the block of video data.

Aspect 21—An apparatus configured to decode video data, the apparatus comprising: means for determining a context for decoding a sign prediction syntax element for a transform coefficient based on a position of the transform coefficient in a block of video data, wherein the sign prediction syntax element indicates whether a sign prediction hypothesis is correct for the transform coefficient; and means for decoding the sign prediction syntax element using the context.

Aspect 22—The apparatus of Aspect 21, wherein the means for determining the context for decoding the sign prediction syntax element for the transform coefficient based on the position of the transform coefficient in the block of video data comprises: means for determining the context for decoding the sign prediction syntax element for the transform coefficient based on whether the transform coefficient is a DC coefficient.

Aspect 23—The apparatus of Aspect 21, wherein the means for determining the context for decoding the sign prediction syntax element for the transform coefficient based on the position of the transform coefficient in the block of video data comprises: means for determining a first context for decoding the sign prediction syntax element based on the transform coefficient being a DC coefficient; and means for determining a second context for decoding the sign prediction syntax element based on the transform coefficient not being the DC coefficient.

Aspect 24—The apparatus of Aspect 21, wherein the means for determining the context for decoding the sign prediction syntax element for the transform coefficient based on the position of the transform coefficient in the block of video data comprises: means for determining the context for decoding the sign prediction syntax element based on a sign prediction order in the block of video data, wherein the position of the transform coefficient in the block of video data is based on the sign prediction order.

Aspect 25—The apparatus of Aspect 21, further comprising: means for determining the context for decoding the sign prediction syntax element for the transform coefficient further based on a coding mode used to code the block of video data.

Aspect 26—The apparatus of Aspect 25, wherein the means for determining the context for decoding the sign prediction syntax element for the transform coefficient further based on the coding mode comprises: means for determining the context for decoding the sign prediction syntax element further based on whether the coding mode used to code the block of video data is an inter prediction coding mode or an intra prediction coding mode.

Aspect 27—The apparatus of Aspect 21, further comprising: means for determining the context for decoding the sign prediction syntax element for the transform coefficient further based on an intra prediction direction.

Aspect 28—The apparatus of any of Aspects 21-27, further comprising: means for determining a sign prediction hypothesis for the transform coefficient; means for determining a sign of the transform coefficient based on the sign prediction hypothesis and the sign prediction syntax element; and means for decoding the block of video data based on the sign of the transform coefficient.

Aspect 29—The apparatus of Aspect 28, wherein the means for determining the sign prediction hypothesis for the transform coefficient comprises: means for minimizing a cost function that includes combined template values.

Aspect 30—The apparatus of Aspect 28, further comprising: means for displaying a picture that includes the block of video data.

Aspect 31—A non-transitory computer-readable storage medium storing instructions that, when executed, cause one or more processors configured to decode video data to: determine a context for decoding a sign prediction syntax element for a transform coefficient based on a position of the transform coefficient in a block of video data, wherein the sign prediction syntax element indicates whether a sign prediction hypothesis is correct for the transform coefficient; and decode the sign prediction syntax element using the context.

Aspect 32—The non-transitory computer-readable storage medium of Aspect 31, wherein to determine the context for decoding the sign prediction syntax element for the transform coefficient based on the position of the transform coefficient in the block of video data, the instructions further cause the one or more processors to: determine the context for decoding the sign prediction syntax element for the transform coefficient based on whether the transform coefficient is a DC coefficient.

Aspect 33—The non-transitory computer-readable storage medium of Aspect 31, wherein to determine the context for decoding the sign prediction syntax element for the transform coefficient based on the position of the transform coefficient in the block of video data, the instructions further cause the one or more processors to: determine a first context for decoding the sign prediction syntax element based on the transform coefficient being a DC coefficient; and determine a second context for decoding the sign prediction syntax element based on the transform coefficient not being the DC coefficient.

Aspect 34—The non-transitory computer-readable storage medium of Aspect 31, wherein to determine the context for decoding the sign prediction syntax element for the transform coefficient based on the position of the transform coefficient in the block of video data, the instructions further cause the one or more processors to: determine the context for decoding the sign prediction syntax element based on a sign prediction order in the block of video data, wherein the position of the transform coefficient in the block of video data is based on the sign prediction order.

Aspect 35—The non-transitory computer-readable storage medium of Aspect 31, wherein the instructions further cause the one or more processors to: determine the context for decoding the sign prediction syntax element for the transform coefficient further based on a coding mode used to code the block of video data.

Aspect 36—The non-transitory computer-readable storage medium of Aspect 35, wherein to determine the context for decoding the sign prediction syntax element for the transform coefficient further based on the coding mode, the instructions further cause the one or more processors to: determine the context for decoding the sign prediction syntax element further based on whether the coding mode used to code the block of video data is an inter prediction coding mode or an intra prediction coding mode.

Aspect 37—The non-transitory computer-readable storage medium of Aspect 31, wherein the instructions further cause the one or more processors to: determine the context for decoding the sign prediction syntax element for the transform coefficient further based on an intra prediction direction.

Aspect 38—The non-transitory computer-readable storage medium of any of Aspects 31-37, wherein the instructions further cause the one or more processors to: determine a sign prediction hypothesis for the transform coefficient; determine a sign of the transform coefficient based on the sign prediction hypothesis and the sign prediction syntax element; and decode the block of video data based on the sign of the transform coefficient.

Aspect 39—The non-transitory computer-readable storage medium of Aspect 38, wherein to determine the sign prediction hypothesis for the transform coefficient, the instructions further cause the one or more processors to: minimize a cost function that includes combined template values.

Aspect 40—The non-transitory computer-readable storage medium of Aspect 38, wherein the instructions further cause the one or more processors to: display a picture that includes the block of video data.

Aspect 41—An apparatus configured to encode video data, the apparatus comprising: a memory configured to store a block of video data; and one or more processors implemented in circuitry and in communication with the memory, the one or more processors configured to: determine a context for encoding a sign prediction syntax element for a transform coefficient based on a position of the transform coefficient in the block of video data, wherein the sign prediction syntax element indicates whether a sign prediction hypothesis is correct for the transform coefficient; and encode the sign prediction syntax element using the context.

Aspect 42—The apparatus of Aspect 41, wherein to determine the context for encoding the sign prediction syntax element for the transform coefficient based on the position of the transform coefficient in the block of video data, the one or more processors are further configured to: determine the context for encoding the sign prediction syntax element for the transform coefficient based on whether the transform coefficient is a DC coefficient.

Aspect 43—The apparatus of Aspect 41, wherein to determine the context for encoding the sign prediction syntax element for the transform coefficient based on the position of the transform coefficient in the block of video data, the one or more processors are further configured to: determine a first context for encoding the sign prediction syntax element based on the transform coefficient being a DC coefficient; and determine a second context for encoding the sign prediction syntax element based on the transform coefficient not being the DC coefficient.

Aspect 44—The apparatus of Aspect 41, wherein to determine the context for encoding the sign prediction syntax element for the transform coefficient based on the position of the transform coefficient in the block of video data, the one or more processors are further configured to: determine the context for encoding the sign prediction syntax element based on a sign prediction order in the block of video data, wherein the position of the transform coefficient in the block of video data is based on the sign prediction order.

Aspect 45—The apparatus of Aspect 41, wherein the one or more processors are further configured to: determine the context for encoding the sign prediction syntax element for the transform coefficient further based on a coding mode used to code the block of video data.

Aspect 46—The apparatus of Aspect 45, wherein to determine the context for encoding the sign prediction syntax element for the transform coefficient further based on the coding mode, the one or more processors are further configured to: determine the context for encoding the sign prediction syntax element further based on whether the coding mode used to code the block of video data is an inter prediction coding mode or an intra prediction coding mode.

Aspect 47—The apparatus of Aspect 41, wherein the one or more processors are further configured to: determine the context for encoding the sign prediction syntax element for the transform coefficient further based on an intra prediction direction.

Aspect 48—The apparatus of any of Aspects 41-47, wherein the one or more processors are further configured to: determining a sign of the transform coefficient; and determining a sign prediction hypothesis for the transform coefficient, and wherein to encode the sign prediction syntax element, the one or more processors are configured to encode the sign prediction using the context based on the sign of the transform coefficient and the sign prediction hypothesis.

Aspect 49—The apparatus of Aspect 48, wherein to determine the sign prediction hypothesis for the transform coefficient, the one or more processors are further configured to: minimize a cost function that includes combined template values.

Aspect 50—The apparatus of Aspect 48, further comprising: a camera configured to capture a picture that includes the block of video data.

Aspect 51—A method of coding video data, the method comprising: determining a context for coding a sign prediction for a transform coefficient based on a position of the transform coefficient; and coding the sign prediction using the determined context.

Aspect 52—The method of Aspect 51, wherein the sign prediction is a bin that indicates whether a sign prediction hypothesis is correct for the transform coefficient.

Aspect 53—The method of any of Aspects 51-52, wherein determining the context for coding the sign prediction for the transform coefficient based on the position of the transform coefficient comprises: determining a first context for coding the sign prediction based on the transform coefficient being a DC coefficient; and determining a second context for coding the sign prediction based on the transform coefficient not being the DC coefficient.

Aspect 54—The method of any of Aspects 51-52, wherein determining the context for coding the sign prediction for the transform coefficient based on the position of the transform coefficient comprises: determining the context for coding the sign prediction based on a quadrant of a block that includes the transform coefficient.

Aspect 55—The method of any of Aspects 51-52, wherein determining the context for coding the sign prediction for the transform coefficient based on the position of the transform coefficient comprises: determining to use the same context for two transform coefficients that have position symmetry.

Aspect 56—The method of any of Aspects 51-52, wherein determining the context for coding the sign prediction for the transform coefficient based on the position of the transform coefficient comprises: determining the context for coding the sign prediction based on a sign prediction order.

Aspect 57—A method of coding video data, the method comprising: determining a context for coding a sign prediction for a transform coefficient based on a coding mode; and coding the sign prediction using the determined context.

Aspect 58—The method of Aspect 57, wherein the sign prediction is a bin that indicates whether a sign prediction hypothesis is correct for the transform coefficient.

Aspect 59—The method of any of Aspects 57-58, wherein determining the context for coding the sign prediction comprises: determining the context for coding the sign prediction based on the use of inter prediction or intra prediction to code the block including the transform coefficient.

Aspect 60—The method of any of Aspects 57-58, wherein determining the context for coding the sign prediction comprises: determining the context for coding the sign prediction based on an intra prediction direction.

Aspect 61—The method of any of Aspects 57-58, wherein determining the context for coding the sign prediction comprises: determining the context for coding the sign prediction based on a primary transform.

Aspect 62—The method of any of Aspects 57-58, wherein determining the context for coding the sign prediction comprises: determining the context for coding the sign prediction based on a secondary transform.

Aspect 63—The method of any of Aspects 51-62, wherein coding comprises decoding, wherein the method further comprises: determining a sign prediction hypothesis for the transform coefficient; determining a sign of the transform coefficient based on the sign prediction hypothesis and the decoded sign prediction; and decoding a block of video data based on the determined sign.

Aspect 64—The method of any of Aspects 51-62, wherein coding comprises encoding, wherein the method further comprises: determining a sign of the transform coefficient; and determining a sign prediction hypothesis for the transform coefficient, wherein encoding the sign prediction comprises encoding the sign prediction using the determined context based on the sign of the transform coefficient and the sign prediction hypothesis.

Aspect 65—The method of any of Aspects 63-64, wherein determining the sign prediction hypothesis for the transform coefficient comprises: determining the sign prediction hypothesis by minimizing a cost function that includes combined template values.

Aspect 66—The method of any combination of Aspects 51-65.

Aspect 67—A device for coding video data, the device comprising one or more means for performing the method of any of Aspects 51-66.

Aspect 68—The device of Aspect 67, wherein the one or more means comprise one or more processors implemented in circuitry.

Aspect 69—The device of any of Aspects 67 and 68, further comprising a memory to store the video data.

Aspect 70—The device of any of Aspects 67-69, further comprising a display configured to display decoded video data.

Aspect 71—The device of any of Aspects 67-70, wherein the device comprises one or more of a camera, a computer, a mobile device, a broadcast receiver device, or a set-top box.

Aspect 72—The device of any of Aspects 67-71, wherein the device comprises a video decoder.

Aspect 73—The device of any of Aspects 67-72, wherein the device comprises a video encoder.

Aspect 74—A computer-readable storage medium having stored thereon instructions that, when executed, cause one or more processors to perform the method of any of Aspects 51-66.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining a context, from a plurality of contexts, for decoding a sign prediction syntax element for a transform coefficient of a block of video data based on a position of the transform coefficient in the block of video data, wherein the sign prediction syntax element indicates whether a sign prediction hypothesis is correct for the transform coefficient;
    decoding the sign prediction syntax element using the context;
    determining the sign prediction hypothesis for the transform coefficient;
    determining a sign of the transform coefficient based on the sign prediction hypothesis and the sign prediction syntax element; and
    decoding the block of video data based on the sign of the transform coefficient.

2. The method of claim 1, wherein determining the context, from the plurality of contexts, for decoding the sign prediction syntax element for the transform coefficient based on the position of the transform coefficient in the block of video data comprises: determining the context, from the plurality of contexts, for decoding the sign prediction syntax element for the transform coefficient based on whether the transform coefficient is a DC coefficient.

3. The method of claim 1, wherein determining the context, from the plurality of contexts, for decoding the sign prediction syntax element for the transform coefficient based on the position of the transform coefficient in the block of video data comprises:
    determining a first context, from the plurality of contexts, for decoding the sign prediction syntax element based on the transform coefficient being a DC coefficient; and
    determining a second context, from the plurality of contexts, for decoding the sign prediction syntax element based on the transform coefficient not being the DC coefficient.

4. The method of claim 1, wherein determining the context, from the plurality of contexts, for decoding the sign prediction syntax element for the transform coefficient based on the position of the transform coefficient in the block of video data comprises:
    determining the context, from the plurality of contexts, for decoding the sign prediction syntax element based on a sign prediction order in the block of video data, wherein the position of the transform coefficient in the block of video data is based on the sign prediction order, and wherein the sign prediction order is a scanning order within the block.

5. The method of claim 1, further comprising:
    determining the context, from the plurality of contexts, for decoding the sign prediction syntax element for the transform coefficient further based on a coding mode used to encode the block.

6. The method of claim 5, wherein determining the context, from the plurality of contexts, for decoding the sign prediction syntax element for the transform coefficient further based on the coding mode comprises:
    determining the context, from the plurality of contexts, for decoding the sign prediction syntax element further based on whether the coding mode used to code the block of video data is an inter prediction coding mode or an intra prediction coding mode.

7. The method of claim 1, further comprising:
    determining the context, from the plurality of contexts, for decoding the sign prediction syntax element for the transform coefficient further based on an intra prediction direction.

8. The method of claim 1, wherein determining the sign prediction hypothesis for the transform coefficient comprises:
    minimizing a cost function that includes combined template values.

9. The method of claim 1, further comprising:
    displaying a picture that includes the block of video data.

10. An apparatus configured to decode video data, the apparatus comprising:
    a memory configured to store a block of video data; and
    one or more processors implemented in circuitry and in communication with the memory, the one or more processors configured to:
        determine a context, from a plurality of contexts, for decoding a sign prediction syntax element for a transform coefficient of a block of video data based on a position of the transform coefficient in the block of video data, wherein the sign prediction syntax element indicates whether a sign prediction hypothesis is correct for the transform coefficient;
        decode the sign prediction syntax element using the context;
        determine the sign prediction hypothesis for the transform coefficient;
        determine a sign of the transform coefficient based on the sign prediction hypothesis and the sign prediction syntax element; and
        decode the block of video data based on the sign of the transform coefficient.

11. The apparatus of claim 10, wherein to determine the context, from the plurality of contexts, for decoding the sign prediction syntax element for the transform coefficient based on the position of the transform coefficient in the block of video data, the one or more processors are further configured to:
    determine the context, from the plurality of contexts, for decoding the sign prediction syntax element for the transform coefficient based on whether the transform coefficient is a DC coefficient.

12. The apparatus of claim 10, wherein to determine the context, from the plurality of contexts, for decoding the sign prediction syntax element for the transform coefficient based on the position of the transform coefficient in the block of video data, the one or more processors are further configured to:

determine a first context, from the plurality of contexts, for decoding the sign prediction syntax element based on the transform coefficient being a DC coefficient; and determine a second context, from the plurality of contexts, for decoding the sign prediction syntax element based on the transform coefficient not being the DC coefficient.

13. The apparatus of claim 10, wherein to determine the context, from the plurality of contexts, for decoding the sign prediction syntax element for the transform coefficient based on the position of the transform coefficient in the block of video data, the one or more processors are further configured to:

determine the context, from the plurality of contexts, for decoding the sign prediction syntax element based on a sign prediction order in the block of video data, wherein the position of the transform coefficient in the block of video data is based on the sign prediction order, and wherein the sign prediction order is a scanning order within the block.

14. The apparatus of claim 10, wherein the one or more processors are further configured to:

determine the context, from the plurality of contexts, for decoding the sign prediction syntax element for the transform coefficient further based on a coding mode used to encode the block.

15. The apparatus of claim 14, wherein to determine the context, from the plurality of contexts, for decoding the sign prediction syntax element for the transform coefficient further based on the coding mode, the one or more processors are further configured to:

determine the context, from the plurality of contexts, for decoding the sign prediction syntax element further based on whether the coding mode used to code the block of video data is an inter prediction coding mode or an intra prediction coding mode.

16. The apparatus of claim 10, wherein the one or more processors are further configured to:

determine the context, from the plurality of contexts, for decoding the sign prediction syntax element for the transform coefficient further based on an intra prediction direction.

17. The apparatus of claim 10, wherein to determine the sign prediction hypothesis for the transform coefficient, the one or more processors are further configured to:

minimize a cost function that includes combined template values.

18. The apparatus of claim 10, further comprising:

a display configured to display a picture that includes the block of video data.

19. The apparatus of claim 10, wherein the apparatus is a wireless communication device.

20. An apparatus configured to encode video data, the apparatus comprising:

a memory configured to store a block of video data; and one or more processors implemented in circuitry and in communication with the memory, the one or more processors configured to:

determine a sign of a transform coefficient of a block of video data;

determine a sign prediction hypothesis for the transform coefficient;

determine a context, from a plurality of contexts, for encoding a sign prediction syntax element for the transform coefficient of the block of video data based on a position of the transform coefficient in the block of video data, wherein the sign prediction syntax element indicates whether the sign prediction hypothesis is correct for the transform coefficient; and encode the sign prediction syntax element using the context based on the sign of the transform coefficient and the sign prediction hypothesis.

21. The apparatus of claim 20, wherein to determine the context, from a plurality of contexts, for encoding the sign prediction syntax element for the transform coefficient based on the position of the transform coefficient in the block of video data, the one or more processors are further configured to:

determine the context, from a plurality of contexts, for encoding the sign prediction syntax element for the transform coefficient based on whether the transform coefficient is a DC coefficient.

22. The apparatus of claim 20, wherein to determine the context, from the plurality of contexts, for encoding the sign prediction syntax element for the transform coefficient based on the position of the transform coefficient in the block of video data, the one or more processors are further configured to:

determine a first context, from the plurality of contexts, for encoding the sign prediction syntax element based on the transform coefficient being a DC coefficient; and determine a second context, from the plurality of contexts, for encoding the sign prediction syntax element based on the transform coefficient not being the DC coefficient.

23. The apparatus of claim 20, wherein to determine the context, from the plurality of contexts, for encoding the sign prediction syntax element for the transform coefficient based on the position of the transform coefficient in the block of video data, the one or more processors are further configured to:

determine the context, from the plurality of contexts, for encoding the sign prediction syntax element based on a sign prediction order in the block of video data, wherein the position of the transform coefficient in the block of video data is based on the sign prediction order, and wherein the sign prediction order is a scanning order within the block.

24. The apparatus of claim 20, wherein the one or more processors are further configured to:

determine the context, from the plurality of contexts for encoding the sign prediction syntax element for the transform coefficient further based on a coding mode used to encode the block.

25. The apparatus of claim 24, wherein to determine the context, from the plurality of contexts, for encoding the sign prediction syntax element for the transform coefficient further based on the coding mode, the one or more processors are further configured to:

determine the context, from the plurality of contexts, for encoding the sign prediction syntax element further based on whether the coding mode used to code the block of video data is an inter prediction coding mode or an intra prediction coding mode.

26. The apparatus of claim 20, wherein the one or more processors are further configured to:

determine the context, from the plurality of contexts, for encoding the sign prediction syntax element for the transform coefficient further based on an intra prediction direction.

27. The apparatus of claim 20, wherein to determine the sign prediction hypothesis for the transform coefficient, the one or more processors are further configured to:

minimize a cost function that includes combined template values.

28. The apparatus of claim 20, further comprising:
a camera configured to capture a picture that includes the block of video data.

29. The apparatus of claim 20, wherein the apparatus is a wireless communication device.

* * * * *